United States Patent [19]

Kurokawa et al.

[11] Patent Number: 4,562,483
[45] Date of Patent: Dec. 31, 1985

[54] TRANSMISSION INTERRUPTION SIGNAL DETECTION SYSTEM

[75] Inventors: Hiroshi Kurokawa, Yokohama; Sunji Kurokawa, Sagamihara; Yuichi Saito, Machida, all of Japan

[73] Assignee: Ricoh Company, Ltd., Tokyo, Japan

[21] Appl. No.: 73,291

[22] Filed: Sep. 7, 1979

[30] Foreign Application Priority Data

Sep. 9, 1978 [JP] Japan ................. 53-110237

[51] Int. Cl.$^4$ ............................. H04N 1/32
[52] U.S. Cl. .................. 358/257; 179/2 DP
[58] Field of Search .............. 358/257, 280, 281; 179/2 DP, 2 C, 2 A, 1 C

[56] References Cited

U.S. PATENT DOCUMENTS

| 3,914,538 | 10/1975 | Perrault | 358/257 |
| 4,112,467 | 9/1978 | Ogawa | 358/257 |
| 4,191,855 | 3/1980 | Sakai | 179/2 DP |

OTHER PUBLICATIONS

Microtran Engineering Application Bulletin F232-6/72, "Telephone Coupling Transformers", c. 1972.

Primary Examiner—Howard W. Britton
Attorney, Agent, or Firm—Oblon, Fisher, Spivak, McClelland & Maier

[57] ABSTRACT

In a transmission interruption signal detection system of a facsimile system transmitting image information from transmission apparatus to reception apparatus and producing a transmission interruption signal of a predetermined frequency and sending the same continuously for a predetermined period of time from the reception apparatus to the transmission apparatus when the reception apparatus is hung up, a hybrid transformer apparatus is provided, and transmission of the image information and reception of the transmission interruption signal are performed through the hybrid transformer apparatus, and signals having the predetermined frequency are extracted from signals obtained during transmission of the image information through the hybrid transformer apparatus and when the generation of the extracted signals continues for the predetermined period of time or longer, the transmission interruption detection signal is produced.

8 Claims, 7 Drawing Figures

TRANSMISSION INTERRUPTION SIGNAL DETECTION SYSTEM

BACKGROUND OF THE INVENTION

The present invention relates to a transmission interruption signal detection system of a facsimile system and more particularly to a transmission interruption signal detection system for detecting a transmission interruption signal at a transmission apparatus of facsimile system when the reception apparatus is hung up during the transmission of image information from the transmission apparatus to a reception apparatus of the facsimile system.

In the facsimile system when a reception apparatus is hung up for some reason and the reception of image information is discontinued or interrupted during the transmission of image information from the transmission apparatus to the reception apparatus, some measure has to be taken by detecting a signal indicating the interruption of the transmission.

An image information communication system capable of taking a measure against such interruption of communication by detecting a transmission interruption signal at a transmission apparatus of the image information communication system has been proposed in the U.S. Pat. No. 4,112,467 assigned to Ricoh Company Ltd.

In the above-mentioned invention, when the interruption signal is set at a predetermined frequency, there is a risk that the transmission apparatus detects, as the transmission interruption signals, image information components having the same frequency as that of the transmission interruption signal, which are produced from the transmission apparatus itself, so that malfunction of the transmission apparatus occurs.

According to a standard G 3 made by international Telegraph and Telephone Consultative Committee (CCITT), it is required that when reception apparatus of facsimile system is hung up, the reception apparatus generates a transmission interruption signal of 462 Hz for 3 seconds for indicating interruption of communication and send the signal to its counterpart transmission apparatus.

However, since the transmission interruption signal of 462 Hz in confirmity with the standard of CCITT is of a low frequency, the signal is attenuated considerably in the channel connecting the transmission apparatus to the reception apparatus due to the low frequency characteristic of telephone line. For example, when the transmission apparatus is transmitting image information at −7 dBm, the transmission apparatus has to detect a transmission interruption signal, attenuated to as low as −30 dBm, which is transmitted from the reception apparatus through the same channel.

Furthermore, since the transmission frequency of image information contains the same frequency component as that of the transmission interruption signal, the detection of the transmission interruption signal transmitted from the reception apparatus to the transmission apparatus becomes the more difficult.

For examole, the frequency band width of 4800 BPS Modem is approximately in the range from 600 Hz to 2700 Hz, and the frequency band width of 9600 BPS Modem is approximately in the range from 500 Hz to 3000 Hz. Both Modems generate the low frequency components of 462 Hz intermittently. Therefore, it is extremely difficult for the transmission apparatus to detect the transmission interruption signal of 462 Hz, which is sent from the reception apparatus to the transmission apparatus through the same channel during the transmission of the image information, by use of only a frequency detection circuit. In particular, since the lowermost frequency of 9600 BPS Modem is closer to 462 Hz than that of 4800 PBS, 9600 BPS Modem frequently generates more component signals having the same frequency as that of the transmission interruption signal. Therefore, there is a risk that the 462 Hz signal components of the image information produced from the transmission apparatus are detected erroneously as the transmission interruption signal, so that a malfunction occurs in the transmission apparatus.

Therefore, in the case of 4800 BPS Modem, even if a transmission interruption signal of −30 dBm sent from the reception apparatus is detected successfully by the transmission apparatus, in the case of 9600 BPS Modem, the sole detection of the transmission interruption signal becomes more difficult since the lowermost detectable limit of 9600 BPS Modem is, for example, −25 dBm.

SUMMARY OF THE INVENTION

It is therefore an object of the present invention to provide a transmission interruption signal detection system capable of detecting securely a transmission interruption detection signal sent from reception apparatus to transmission apparatus of facsimile system when the transmission system is sending image information to the reception apparatus.

In order to attain this object, according to the present invention, in the facsimile apparatus capable of transmitting image information from the transmission apparatus to the reception apparatus, while the reception apparatus continuously sending a transmission interruption signal of a predetermined frequency for a predetermined period of time to the transmission apparatus, there is provided a hybrid transformer in the transmission apparatus, and transmission of image information and reception of the transmission interruption signal are performed through the hybrid transformer, and the signal having the above-mentioned predetermined frequency is extracted from signals obtained through the hybrid transformer, and when the extracted signal is continuously sent for the predetermined period time or longer, the transmission interruption signal is generated from the hybrid transformer.

BRIEF DESCRIPTION OF THE DRAWINGS

For a better understanding of the invention as well as the object and other features thereof, reference will be had to the following detailed description which is to be read in conjunction with the drawings wherein.

DETAILED DESCRIPTION OF THE PREFERRED EMBODIMENT

Figure 1:
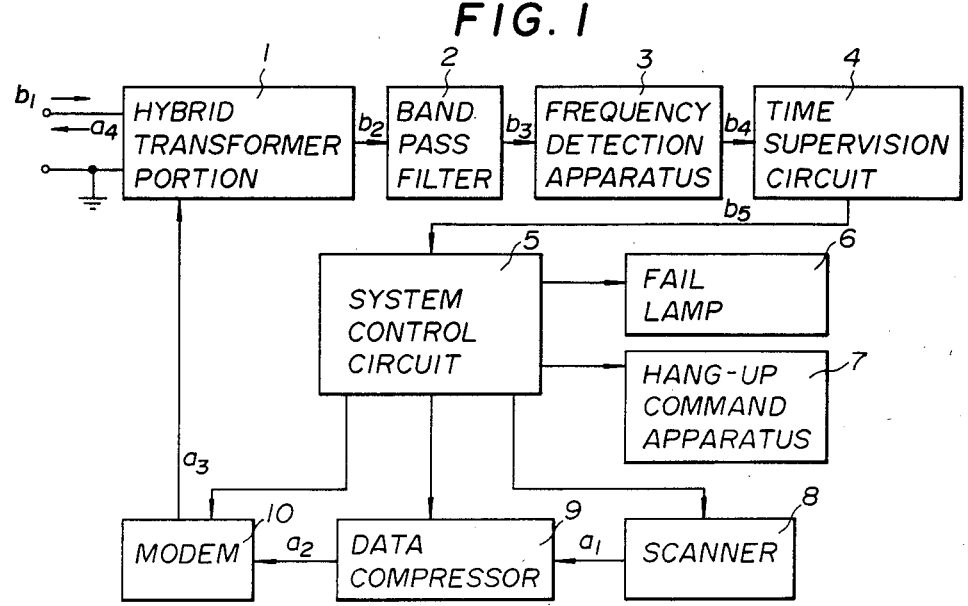
FIG. 1 is a block diagram of a transmission apparatus employing the transmission interruption detection system according to the present invention.

Referring to FIG. 1, there is shown a block diagram of a transmission apparatus employing a transmission interruption signal detection system according to the present invention. In the figure, reference numeral 1 represents a hybrid transformer apparatus which sends image information produced from a modem 10 to a channel for transmission of the image information to reception apparatus and which picks up a transmission interruption signal sent from the reception apparatus to the transmission apparatus from the same channel and applies the transmission interruption signal to the transmission apparatus.

Figure 2:
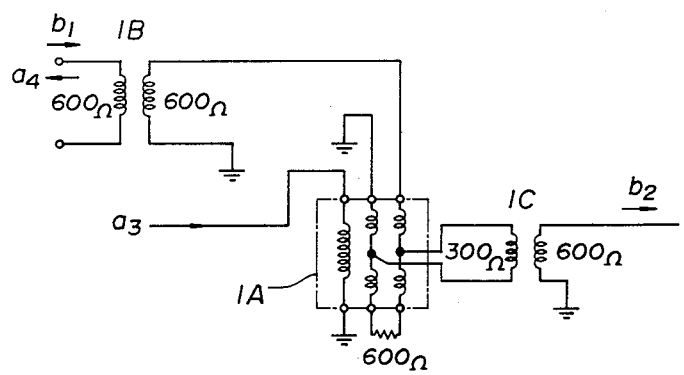
FIG. 2 is a circuit diagram of a specific hybrid transformer apparatus of the transmission apparatus of FIG. 1.

FIG. 2 shows an example of a specific construction of the hybrid transformer apparatus 1. In FIG. 2, reference numeral 1A represents a conventional hybrid transformer and reference numerals 1B and 1C represent balance transformers. Image information $a_3$ from the modem 10 (refer to FIG. 1) is sent to the channel through the hybrid transformer 1A and the balance transformer 1B. On the other hand, a transmission interruption signal $b_1$ sent from the reception apparatus to the transmission apparatus is applied to the transmission apparatus through the channel, the balance transformer 1B, the hybrid transformer 1A, and the balance transformer 1C.

Figure 3:
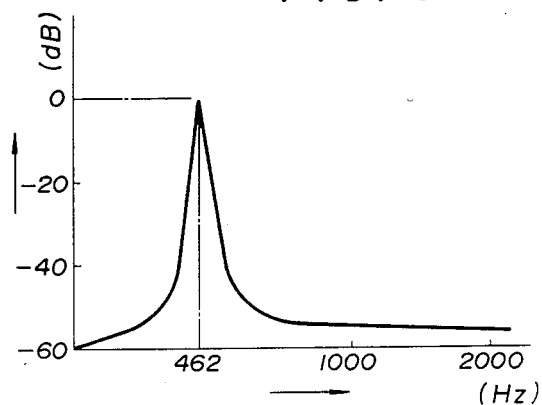
FIG. 3 is a characteristic diagram of a band filter of the transmission apparatus of FIG. 1.

As shown in FIG. 3, a transmission interruption signal $b_2$ that has been picked by the transmission apparatus is applied to a frequency detection apparatus 3 through a band pass filter 2 having a characteristic of allowing a signal of the frequency of 462 Hz, for example, to pass therethrough.

The frequency detection circuit 3 is constructed of a tone decoder, such as IC : LM 567, for example, or of a detection circuit 31, an integration circuit 32, a double invertor circuit 33 as shown in FIG. 4.

As is well known, the tone decoder is a circuit which generates an output when a signal of a predetermined frequency is continuously applied thereto for a predetermined period of time equivalent to not less than a predetermined number of the periods of the signal. Namely, in the case of the present embodiment, when a signal of the frequency of 462 Hz is continuously applied to the circuit for a period of time equivalent to not less than, for example, 50 periods of the signal, the tone decoder generates an output signal. Therefore, when the frequency detection circuit 3 is constructed using the tone decoder, the frequency of the signal is detected at the same time, so that the use of the band pass filter 2 becomes unnecessary.

Figure 4:
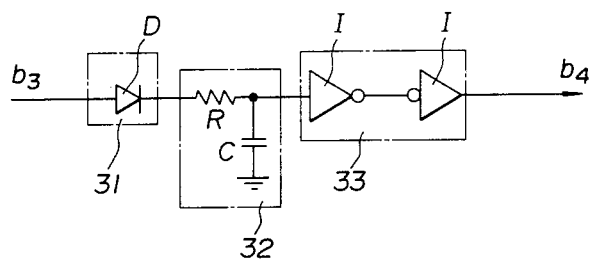
FIG. 4 is a circuit diagram of a specific frequency detection circuit of the transmission apparatus of FIG. 1.

When the frequency detection circuit 3 is constructed of a detection circuit 31 using a diode D, an RC integration circuit 32, and a double invertor circuit 33 in which two invertors I are connected to each other, as shown in FIG. 4, a signal $b_3$ having the frequency of 462 Hz, produced from the band filter 2, is detected by the detection circuit 31 and is then integrated by the integration circuit 32 and a threshold level of the signal $b_3$ is then determined by a first step of the double invertor 33 and the level is inverted by the next step of the double invertor 33. As a result, as in the case where the tone decoder is used when a signal of 463 Hz is continuously applied to the frequency detection circuit 3 for a predetermined period of time or longer, for example, for a period of time equivalent to not less than 50 periods of the signal, an output signal $b_4$ is produced from the frequency detection circuit 3.

The output signal $b_4$ from the frequency detection circuit 3 is then applied to a time supervision circuit 4.

Figure 5:
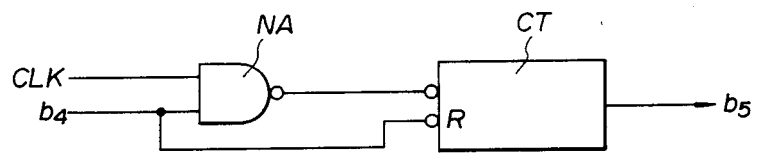
FIG. 5 is a circuit diagram of a specific time supervision circuit of the transmission apparatus of FIG. 1.

The time supervision circuit 4 in FIG. 1 is constructed of, for example, a NAND gate NA and a time counter CT as shown in FIG. 5.

When the output signal $b_4$ is produced from the frequency detection circuit 3, a clock pulse CLK is applied to the counter CT through the NAND gate NA. The counter CT, counting the clock pulse CLK, produces an output signal $b_5$ in a predetermined time, for example, in 1 second, and applies the output signal $b_5$ to a system control circuit 5.

The system control circuit 5, receiving the output signal $b_5$ from the time supervision circuit 4, lights a fail lamp 6 for indicating the interruption or discontinuation of communication and actuates a hang-up commanding apparatus 7.

Furthermore, the system control circuit 5 controls a scanner 8, a data compressor 9 and the modem 10, so that after image information $a_1$ read by the scanner 8 is compressed by the data compressor 9, image information $a_3$ from the modem 10 is applied to the hybrid transformer apparatus 1.

Referring to the time charts of FIG. 6 and FIG. 7, the operation of the transmission apparatus will now be explained.

The image information $a_1$ read by the scanner 8 is subjected to data compression by the data compressor 9 under the control of the system control circuit 5, so that the image information $a_1$ is converted to image information $a_2$ by the data compressor 9. The image information $a_2$ is modulated as shown in the waveform (A) of FIG. 6 by the modem 10, so that the image information $a_2$ is converted to the image information $a_3$, which is then sent, in the form of image information $a_4$, from the hybrid transformer apparatus to the reception apparatus.

Figure 6:
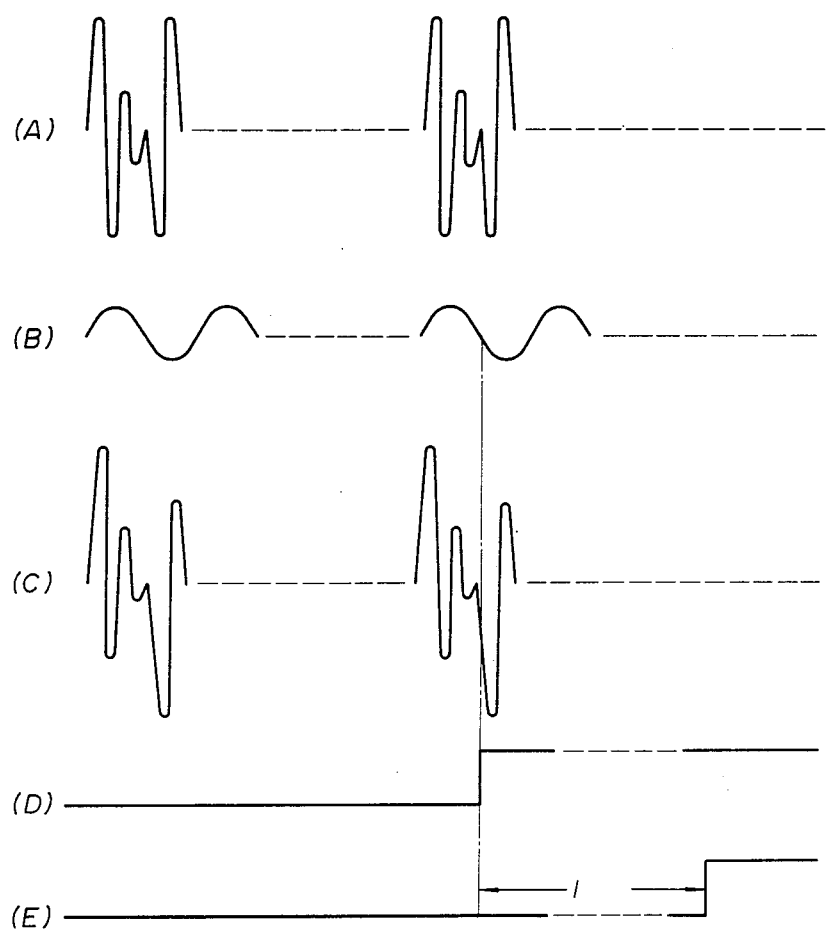
FIG. 6 and FIG. 7 show the operation time charts of the transmission apparatus of FIG. 1.

When the reception apparatus is hung up for some reason during transmission of the image information $a_4$ from the transmission apparatus to the reception apparatus, the reception apparatus sends the transmission interruption signal $b_1$ (the waveform (B) of FIG. 6) for indicating the interruption of reception of the image information $a_4$ to the transmission apparatus.

Therefore, waveforms (C) as shown in FIG. 6, which are composite waveforms of the waveforms (A) and the waveforms (B), appear in the channel.

The transmission interruption signal $b_1$ is applied, in the form of the transmission interruption signal $b_2$, from the hybrid transformer apparatus to the band pass filter 2.

At this moment, the signal level of the image information $a_3$ produced from the modem 10 is, for example, about $-7$ dBm, while the echo loss of the hybrid transformer 1A is, for example, in the range of $-25$ dB to $-30$ dB. Therefore, the image information applied from the hybrid transformer 1A to the band pass filter 2 is attenuated to the signal level in the range of $-32$ dB to $-37$ dB. On the other hand, the transmission interruption signal $b_1$ from the channel is applied to the band pass filter 2 with almost no attenuation or with the attenuation in the range of $-1$ to $-2$ dB, if any.

As a result, in comparison with the transmission interruption signal, the signal level of the image information is significantly lowered, so that the transmission interruption signal can be easily detected.

The band pass filter 2 extracts only a signal of the frequency of 462 Hz from all the signals applied thereto and applies the extracted signal to the frequency detection circuit 3.

Therefore, when the reception apparatus is hung up and produces the transmission interruption signal $b_1$ of 462 Hz for 3 seconds, the transmission interruption signal $b_3$ of 462 Hz in the waveform (B) as shown in FIG. 6 is continuously applied to the frequency detection circuit 3. As a result, the frequency detection circuit 3 produces the output signal $b_4$ when the signal of the frequency of 462 Hz has been applied thereto for a period of time equivalent to a predetermined number of the periods of the signal, for example, 50 periods of the signal.

As a result, even if part of the signals of the image information $a_3$ produced from the modem 10 is applied to the frequency detection circuit 3 through the hybrid transformer apparatus 1 and through the band pass filter 2, since the duration of a large part of the signal components of the frequency of 462 Hz contained in the image information $a_3$ is extremely short, the 462 Hz signal components are cut by the frequency detection circuit 3, so that they are not applied to the time supervision circuit 4.

Figure 7:
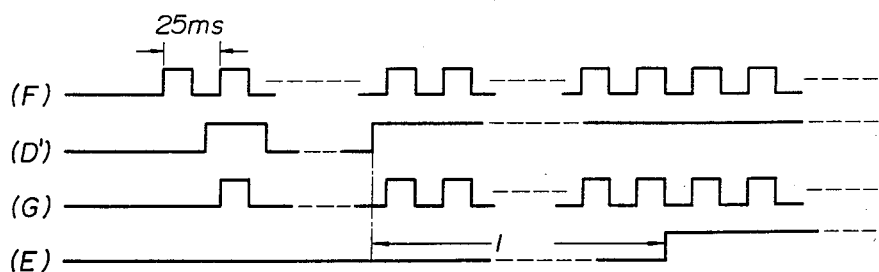

When the transmission interruption signal $b_3$ is applied to the frequency detection circuit 3 and the frequency detection circuit 3 produces the output signal $b_4$, the clock pulse CLK, for example, of the period of 25 msec in the waveform (F) as shown in FIG. 7, is counted by the time counter CT in the circuits of the time supervision circuit 4 as shown in FIG. 5.

Namely, when the output signal $b_4$ in the waveform (D) as shown in FIG. 6 or in the waveform (D') as shown FIG. 7 is generated from the frequency detection circuit 3, the clock pulse CLK in the waveform (G) as shown in FIG. 7 is applied from the NAND gate NA to the time counter CT during the generation of the output $b_4$. The time counter CT counts 40 of the clock pulses CLK and, in 1 second thereafter, produces the output signal $b_5$ in the waveform (E) as shown in FIG. 6 and FIG. 7.

The signal components of 462 Hz that cannot be eliminated by the frequency detection circuit 3 can be completely eliminated by the time supervision circuit 4 from the image information signal $a_3$, so that the transmission interruption signal can be securely detected.

In other words, the duration of the 462 Hz frequency components of the image information which passes through the band pass filter 2 from the hybrid transformer apparatus 1 is so short that most of the 462 Hz frequency components are cut by the frequency detection circuit 3.

However, 462 Hz frequency components with such a duration as are allowed to pass through the frequency detection circuit 3 are occasionally produced during the transmission of image information. In this case, the frequency detection circuit 3 produces the output signal $b_4$ in the waveform (D') as shown in FIG. 7. However, since the duration of the signal of the output signal $b_4$ does not exceeds 1 second, the time counter CT does not produce the output signal $b_5$.

By incorporating the frequency detection circuit 3 and the time supervision circuit 4, the output signal $b_5$ is produced only when a signal of 462 Hz is picked up and the generation of the signal lasts for a predetermined period of time. Therefore, only the transmission interruption signal can be securely detected, without detecting the 462 Hz frequency components which may be contained in the image information produced from the transmission apparatus.

With the generation of the output signal $b_5$ from the time supervision circuit 4, the system control circuit 5 lights the fail lamp 6 and actuates the hung up command apparatus 7, whereby the transmission apparatus is hung up.

In the above-mentioned embodiment, the transmission interruption signal is generated at 462 Hz for 3 seconds in accordance with the standard with the standard of CCITT. However, it is just an embodiment of a transmission interruption detection system according to the present invention, and the present invention is not limited to the embodiment. Therefore, the characteristics of the band pass filter 2 and the tone decoder, and the supervision time of the supervision circuit 4 can be changed case by case.

Furthermore, the present invention can be applied to a facsimile system of full duplex type.

While a specific embodiment of the invention has been shown in detail to illustrate the application of the principles of the invention, it will be understand that the invention may be embodied otherwise without departing from such principles.

What is claimed is:

1. In a facsimile apparatus capable of transmitting image information from transmission apparatus to reception apparatus and, in the meantime, capable of producing a transmission interruption signal of a predetermined frequency and sending the same continuously for a predetermined period of time from the reception apparatus to the transmission apparatus when the reception apparatus is hung up, a transmission interruption signal detection system in which a hybrid transformer apparatus and clock signal count means are provided in said transmission apparatus, and transmission of the image information and reception of said transmission interruption signal are performed through said hybrid transformer apparatus, whereby the signal level of the image information is lowered to a much larger extent than the transmission interruption signal, and signals having said predetermined frequency are extracted from signals obtained during transmission of said image information through said hybrid transformer apparatus and by controlling said clock signal count means by said extracted signals, when the generation of said extracted signals continues for said predetermined period of time or longer, said transmission interruption detection signal is produced.

2. A transmission interruption signal detection system as claimed in claim 1, wherein said extracted signals are received by a frequency detection circuit to determine that said extracted signals are of a specified frequency and at least a first duration, the output of said frequency detection circuit gating a clock signal as an input to said clock signal count means to determine that said extracted signals are of at least a second duration greater than said first duration.

3. A transmission interruption signal detection system as claimed in claim 1, wherein component signals having said predetermined frequency are extracted by a band pass filter from signals obtained through said hybrid transformer apparatus and the duration of said extracted signals, which lasts a period of time equivalent to a predetermined number of the periods of said signals having said predetermined frequency or longer, is detected by a frequency detection circuit, and said transmission interruption signal is produced in accordance with the detection of the duration of said extracted signals.

4. A transmission interruption signal detection system as claimed in claim 2, wherein when the generation of a detection output signal from said frequency detection circuit continues for a predetermined period of time, said transmission interruption detection signal is produced.

5. A transmission interruption signal detection system as claimed in claim 2, wherein said band pass filter and said frequency detection circuit are constructed of a tone decoder.

6. The facsimile transmitting apparatus for transmitting signals representing dark/light variations in a document comprising:
   sensor means for detecting dark/light variations in a document at the transmitting apparatus;
   transmitting means for generating and transmitting signals including signals representing the dark/light variations in the document to be transmitted to a remotely located receiver, said transmitting signals have a varying frequency content;
   receiving means for detecting received signals including an interrupt signal of predetermined frequency content from the remotely located receiver indicating that the receiver has interrupted reception of transmitted signals while said transmitting means is simultaneously generating and transmitting said transmitting signals; and
   control means coupled to said transmitting means and to said receiving means for interrupting transmission of said transmitting signals, said control means including means for detecting the presence of said predetermined frequency during successive periods, said control means interrupting transmission only after detecting the presence of said predetermined frequency during a predetermined number of successive periods.

7. A facsimile transmitting apparatus for transmitting signals representing image data, comprising:
   a scanner for generating the image data;
   a data compressor coupled to the scanner for compressing the image data produced by the scanner;
   a Modem coupled to the compressor for transmitting the compressed data;
   a hybrid transformer coupled to the Modem wherein transmission of the image data is performed through the hybrid transformer;
   a band pass filter coupled to the hybrid transformer;
   a frequency detection apparatus coupled to the band pass filter for producing a detection output when said filter passes a filtered signal therethrough;
   a time supervision circuit comprising a gate having a first input coupled to the detection output, a second input coupled to a clock and an output, and a counter having a count input coupled to the output of said gate and a reset input coupled to the detection output, said counter producing an output only after a predetermined number of cycles of said clock occur in the presence of said detection output; and
   a system control unit coupled to said Modem, said data compressor and said scanner for receiving the output of the time supervision circuit and for interrupting transmission of image data upon production of the counter output.

8. The facsimile transmitting apparatus for transmitting image data signals representing dark/light image variations in a document, comprising:
   sensor means for detecting dark/light image variations in a document at the transmitting apparatus;
   transmitting means for generating and transmitting image data signals representing the dark/light image variations in the document to be transmitted to a remotely located receiver, said image data signals having a varying frequency content;
   receiving means for detecting received signals including an interrupt signal of predetermined frequency content from the remotely located receiver indicating that the receiver has interrupted reception of transmitted image data signals while said transmitting means is simultaneously generating and transmitting said image data signals; and
   control means coupled to said transmitting means and to said receiving means for interrupting transmission of said transmitting signals, said control means including means for detecting the presence of said predetermined frequency during successive periods, said control means interrupting transmission only after detecting the presence of said predetermined frequency during a predetermined number of successive periods.

* * * * *